US005406046A

United States Patent [19]

Landes

[11] Patent Number: 5,406,046

[45] Date of Patent: Apr. 11, 1995

[54] PLASMA SPRAY APPARATUS FOR SPRAYING POWDERY MATERIAL

[75] Inventor: Klaus Landes, München, Germany

[73] Assignee: Plasma Tecknik AG, Wohlen, Switzerland

[21] Appl. No.: 144,685

[22] Filed: Oct. 28, 1993

[30] Foreign Application Priority Data

Nov. 6, 1992 [DE] Germany ........................ 9215133 U

[51] Int. Cl.[6] .............................................. B23K 10/00

[52] U.S. Cl. ............................ 219/121.47; 219/76.16; 219/121.52; 219/121.48; 427/569

[58] Field of Search ...................... 219/121.47, 121.52, 219/121.5, 75, 76.16, 76.15, 121.48; 315/111.21, 111.31; 427/570, 569; 313/231.31, 231.41

[56] References Cited

U.S. PATENT DOCUMENTS

| | | | |
|---|---|---|---|
| 3,839,618 | 10/1974 | Muehlberger | 219/121.52 |
| 4,639,570 | 1/1987 | Zverina et al. | 219/121.52 |
| 4,780,591 | 10/1988 | Bernicki et al. | 219/121.52 |
| 4,788,408 | 11/1988 | Wlodarczyk et al. | 219/121.49 |
| 4,818,837 | 4/1989 | Pfender | 219/121.51 |
| 5,008,511 | 4/1991 | Ross | 219/121.48 |
| 5,043,548 | 8/1991 | Whitney et al. | 219/121.47 |

*Primary Examiner*—Mark H. Paschall

*Attorney, Agent, or Firm*—Tarolli, Sundheim & Covell

[57] ABSTRACT

The plasma spray apparatus for spraying powdery material, particularly for the coating of the surface of a work piece, comprises an indirect plasmatron adapted to create an elongated plasma torch, having a central longitudinal axis and structure for feeding the powdery material into the plasma torch.

The plasmatron comprises a cathode assembly having at least three cathode members evenly distributed along a circle around the central longitudinal axis of the plasmatron, an annular anode member located distantly from the cathode member and a plasma channel extending from the cathode assembly to the anode member.

The plasma channel is delimited by the annular anode member as well as by a plurality of annular neutrode members which are electrically insulated from each other, and the structure for feeding the powdery material into the plasma torch are located close to the anode member.

14 Claims, 2 Drawing Sheets

PLASMA SPRAY APPARATUS FOR SPRAYING POWDERY MATERIAL

BACKGROUND OF THE INVENTION

1. Field of the Invention

For spraying e.g. powdery material in a molten state onto a substrate surface, plasma spray apparatuses are well known in the art which make use of an indirect plasmatron, i.e. an apparatus for creating a plasma with a plasma torch escaping from a nozzle-like element which plasma torch is electrically not current conductive. Usually, the plasma is created by means of a torch and guided through a plasma channel to an outlet nozzle. Thereby, an important difference exists between an apparatus with a short plasma torch and an apparatus with an elongated plasma torch.

2. Prior Art

In a major portion of all plasma spray apparatuses which are commercially used in these days, the plasma torch is created by means of a high current arc discharge between a pin-shaped cathode member and a hollow cylinder anode member. Thereby, the coating material which has to be molten and axially accelerated, e.g. powdery material like metallic or ceramic powder, is introduced into the plasma torch and thereby molten. Many of these plasma spray apparatuses incorporating an indirect plasmatron have the disadvantage that the free plasma torch is not sufficiently stable as far as heat intensity and the position of its radial temperature profile. The result is that the powdery material fed into the plasma torch is thermically unevenly treated; thus, the coatings created with the sprayed material do not have the desired finish.

The reason for this irregularity of the plasma torch in those plasma spray apparatuses may be seen, on the one hand, in the instability of the plasma torch which can have many different causes. Thereby, an important role plays the fact that the foot of the electric arc travels along the extension of the electrodes under certain circumstances. On the other hand, in connection with this traveling of the foot of the electric arc, the thus resulting asymmetric shape of the electric arc with respect to the central longitudinal axis of the plasmatron results in an uneven thermal treatment of the powdery material.

Particularly pronounced are foot travel effects of the electric arc in plasmatrons which operate with a short electric arc, whereby a pin-shaped cathode penetrates the interior of a one-part, nozzle-like anode (cf. German Utility Model No. 1,932,150) because with anode nozzles having an axial extension not only axial but also peripheral travel effects of the foot of the electric arc can occur. At least axial foot travel effects are to be expected in a similar plasma spray apparatus disclosed in German Publication No. 3,312,232 which has not one single, but several cathodes.

Principally, an axial foot travel effect arises due to the fact that an electric arc between a cathode member and a nozzle-shaped anode member is axially stretched, under the influence of the plasma flow, from the cathode member to a point on the anode member which has the greatest distance from the cathode member. Then, the electric arc breaks away from the above mentioned far point of the anode member and attaches again at a point of the anode member which is next to the cathode member. Experience has shown that this phenomena is more or less periodically repeated with a frequency in the region of several kcps. The voltage variations coupled with these variations in length of the electric arc result in severe energy variations (up to ±30%) and, thus in corresponding variations of the intensity of the free plasma torch. Thereby, the powdery material fed into the plasma torch is irregularly treated.

The asymmetric shape of the electric arc has as a result that also the radial temperature profile of the free plasma torch is asymmetric; i.e., the hot central region of the plasma torch is subjected to a certain deviation from the central longitudinal axis of the plasmatron. This deviation is even increased by the fact that the plasma flowing out of the anode nozzle is further heated at the foot of the electric arc, i.e. at an eccentrically located position of the plasmatron. Particularly aggravating is such a deviation of the plasma torch in combination with a peripheral foot traveling of the electric arc. Thereby, a sort of precession motion of the plasma torch is created which usually has an irregular course and results in an even worse treatment of the powdery material if the powdery material is externally fed from a stationary feeding means.

Somewhat better results in these respects can be achieved with a plasma spray apparatus the plasmatron of which operates with a long electric arc, e.g. as disclosed in the European Publication No. 0,249,238 A2. This plasma spray apparatus comprises a plasma channel comprising an annular anode member and a plurality of annular neutrode members which are electrically insulated from each other. By means of this cascade-like design of the plasma channel with its plurality of neutrodes placed in front of the anode member, an axial foot traveling of the electric arc at the anode-sided end thereof is avoided. However, in such a plasmatron, there is a pronounced peripheral foot traveling of the electric arc along the annular anode member if the electric arc originates from a single cathode member, as disclosed e.g. in the European Publication No. 0,249,238 A2. In this respect, the conditions are similar to the ones described herein before in connection with a plasmatron operating with a short electric arc. Thus, also in this case, an uneven thermal treatment of the laterally fed powdery material occurs.

OBJECTS OF THE INVENTION

It is an object of the invention to provide a plasma spray apparatus for spraying powdery material which does not have the disadvantages of the plasma spray apparatuses of the prior art.

It is a further object of the invention to provide a plasma spray apparatus for spraying powdery material which generates a stable free plasma torch.

It is a still further object of the invention to provide a plasma spray apparatus for spraying powdery material which generates a plasma torch in which the powdery material fed thereinto is evenly and regularly treated.

SUMMARY OF THE INVENTION

To achieve these and other objects, the invention provides, according to a first aspect, a plasma spray apparatus for spraying powdery material, particularly for the coating of the surface of a work piece, comprising an indirect plasmatron adapted to create an elongated plasma torch, having a central longitudinal axis and means for feeding the powdery material into the plasma torch.

The plasmatron comprises a cathode assembly having at least three cathode members evenly distributed along a circle around the central longitudinal axis of the plasmatron, an annular anode member located distantly from the cathode member and a plasma channel extending from the cathode assembly to the anode member. The plasma channel has a first end close to the cathode assembly as well as a second end close to the anode member.

The plasma channel is delimited by the annular anode member as well as by a plurality of annular neutrode members which are electrically insulated from each other. The means for feeding the powdery material into the plasma torch are located close to the second end of the plasma channel.

According to a second aspect, the invention provides a plasma spray apparatus for spraying powdery material, particularly for the coating of the surface of a work piece, comprising an indirect plasmatron adapted to create an elongated plasma torch, having a central longitudinal axis, first means for radially feeding the powdery material into the plasma torch and second means for axially feeding the powdery material into the plasma torch.

The plasmatron comprises a cathode assembly having at least three cathode members evenly distributed along a circle around the central longitudinal axis of the plasmatron, an annular anode member located distantly from the cathode member and a plasma channel extending from the cathode assembly to the anode member. The plasma channel has a first end close to the cathode assembly as well as a second end close to the anode member. The plasma channel is delimited by the annular anode member as well as by a plurality of annular neutrode members which are electrically insulated from each other.

The first means for feeding the powdery material into the plasma torch are located close to the second end of the plasma channel and the second means for feeding the powdery material into the plasma torch are located close to the first end of the plasma channel.

Tests conducted with regard to the course of the electric arc in a plasma spray apparatus according to the invention have shown that, using a cathode assembly with three cathode members, the electric arcs starting at the individual cathode members do not unite into a common electric arc which ends in a common foot located at the annular anode member and being subject to foot traveling, but that three individual electric arcs start at the three cathode members and end in discrete foots at the anode member. These electric arc foots do not travel along the periphery of the annular anode member, but are locally fixed. In some cases, e.g. if the flow of the plasma gas in the plasma channel is whirled, the individual foots of the electric arc at the anode member can be somewhat offset with regard to the cathode members. Of particular importance is the further observation that the course of the electric arcs as herein before described does not change even if the plasmatron has a narrow or locally narrowed plasma channel.

In this way, stable conditions can be maintained along the entire path of the electric arcs with the result that a stable free plasma torch can be created which allows an even energy transformation to the powdery material laterally fed into the plasma torch.

BRIEF DESCRIPTION OF THE DRAWING

In the following, preferred embodiments of the apparatus according to the invention will be further described, with reference to the accompanying drawing, in which.

DETAILED DESCRIPTION OF THE PREFERRED EMBODIMENT

Figure 1:
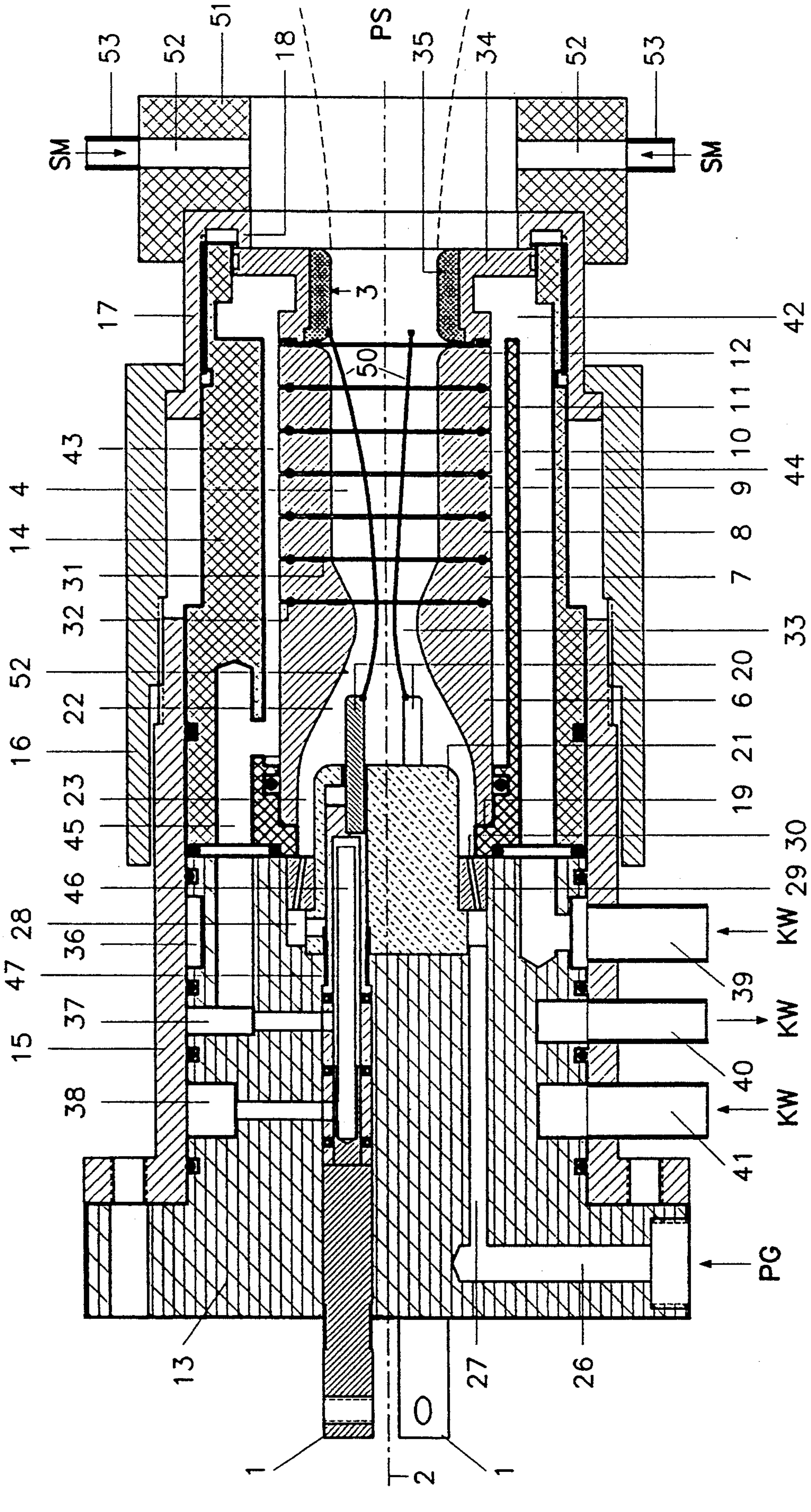
FIG. 1 shows a longitudinal sectional view of a first embodiment of the plasma spray apparatus.

The plasma spray apparatus shown in FIG. 1 comprises three cathode members in the form of longitudinal rod-like cathode assemblies 1 which run parallel to each other and which are arranged on the periphery of a circle around the central longitudinal axis 2 of the apparatus. The arrangement of the cathode assemblies 1 is symmetric with reference to the central longitudinal axis and the cathode assemblies 1 are evenly distributed along the periphery of the circle. Further, the apparatus comprises an annular anode 3 which is located in a certain distance away from the cathode assemblies 1 as well as a plasma channel 4 extending essentially between the ends of the cathode assemblies 1 and the anode 3. The plasma channel 4 is delimited by a plurality of essentially annularly shaped neutrodes 6 to 12 which are electrically insulated with regard to each other as well as by the annular anode 3.

The cathode assemblies 1 are fixed in a cathode support member 13 consisting of an electrically insulating material. Coaxially thereto arranged, adjacent to one end of the cathode support member 13, is a hollow sleeve-like anode support member 14 made of an electrically insulating material which surrounds the neutrodes 6 to 12 as well as the anode 3. The above described arrangement is fixed together by means of three metal sleeves 15, 16 and 17. The first metal sleeve 15 has a flange on its one side (left in FIG. 1) which is fixed by means of screws (not shown) to an end flange of the cathode support member 13. The other end of the first metal sleeve 15 has an outer screw thread and is screwedly fixed to the one end of the coaxially arranged second metal sleeve 16 which comprises a corresponding inner screw thread. The other end of the second metal sleeve 16 is provided with a flange directed to its interior. The third metal sleeve 17 comprises at its one end (right in FIG. 1) an inner screw thread and is screwed on an outer screw thread provided on the outer surface of the anode support member 14. The other end of the third metal sleeve 17 comprises an outer flange engaging the above mentioned inner flange provided at the (in FIG. 1) right end of the second metal sleeve 16. Thus, after the first metal sleeve 15 has been fixed to the flange of the cathode support member 13 and after the third metal sleeve 17 has been screwed on the anode support member 14, the second metal sleeve 16 can be slid over the third metal sleeve 17 to be screwed onto the first metal sleeve 15, thereby pressing the anode support member 14 against the cathode support member 13.

The third metal sleeve 17 further comprises a flange edge 18 resting against the portion 34 of the anode 3. Thereby, the elements forming the plasma channel 4 are held together whereby the neutrode 6 out of the plurality of neutrodes 6 to 12 which is closest to the cathode assemblies 1 rests against an inner recess 19 provided on the anode support member 13.

The cathode assemblies 1 are provided, on its free ends directed towards the plasma channel 4, with cathode pins 20 which consist of a material having an especially good electric and thermal conductivity and, simultaneously, having a high melting temperature, e.g. thoriated tungsten. Thereby, the cathode pins 20 are arranged with reference to the cathode assemblies such that the axis of a cathode pin 20 is not coaxial with the axis of the related cathode assembly 1. This offset is such that the axes of the cathode pins 20 are closer to the central longitudinal axis 2 of the apparatus than the axes of the cathode assemblies 1.

The side of the cathode support 13 facing the plasma channel 4 is provided with a central insulating member 21 made of a material with a very high melting temperature, e.g. glass ceramics material. The insulating member 21 has frontal apertures through which the cathode pins 20 extend into a hollow chamber 22 which is defined by the interior of the first neutrode 6 located closest to the cathode assemblies 1 and forming the beginning of the plasma channel 4. The freely exposed part of the outer jacket surface of the insulating member 21 radially faces with a certain distance a part of the wall of the plasma channel 4 defined by the interior of the neutrode 6; thereby, an annular chamber 23 is formed which serves for feeding the plasma gas into the hollow chamber 22 at the beginning of the plasma channel 4.

The plasma gas PG is fed through a transverse channel 26 provided in the cathode support member 13. The transverse channel 26 merges into a longitudinal channel 27 also provided in the cathode support member 13. Further, the cathode support member 13 is provided with an annular channel 28, and the outlet of the longitudinal channel 27 merges into the annular channel 28. The plasma gas PG, entering the transverse channel 26, flows, through the longitudinal channel 27 into the annular channel 28 and, therefrom, into the annular chamber 23. In order to achieve an optimized laminar flow of the plasma gas PG into the hollow chamber 22, the insulating member 21 is provided with an annular distribution disc 29 having a plurality of apertures 30 which interconnect the annular channel 28 with the annular chamber 23.

The elements defining the plasma channel 4, i.e. the neutrodes 6 to 12 and the anode 3, are electrically insulated from each other by means of annular discs 31 made of an electrically insulating material, e.g. boron nitride, and gas tightly interconnected to each other by means of sealing rings 32. The plasma channel 4 comprises a zone 33 which is located near to the cathode assemblies 1 and which has a smaller diameter than other zones of the plasma channel 4. Starting from that zone 33 with reduced diameter, the plasma channel increases its diameter towards the anode 3 up to a diameter which is at least 1.5 times the diameter of the plasma channel 4 at its narrowest point, i.e. in the center of the zone 33. According to FIG. 1, after this diameter increase, the plasma channel 4 has cylindrical shape up to its end close to the anode 3.

The neutrodes 6 to 12 preferably are made of copper or a copper alloy. The anode 3 is composed of an outer ring 34, made e.g. of copper or a copper alloy, and an inner ring 35, made of a material having a very good electrical and thermal conductivity and simultaneously having a very high melting temperature, e.g. thoriated tungsten.

In order to avoid that the plasma gas flow is disturbed by eventually present gaps in the wall of the plasma channel 4 in the region of the beginning of the plasma channel 4, i.e. close to the cathode assemblies 1, the neutrode 6 located closest to the cathode assemblies 1 extends over the entire zone 33 with reduced diameter. The result is that the wall 52 of the plasma channel 4 in the region of the cathode-sided end thereof is continuously shaped and smooth over the entire zone 33 with reduced diameter.

All parts which are immediately exposed to the heat of the plasma torch and of hot plasma gases are cooled by means of water. For this purpose, several water circulation channels are provided in the cathode support member 13, in the cathode assemblies 1 and in the anode support member 14 in which cooling water KW can circulate. Particularly, the cathode support member 13 comprises three annular circulation channels 36, 37 and 38, which are connected to supply pipes 39, 40 and 41, respectively. The anode support member 14 comprises an annular circulation channel 42 located in the region of the anode 4 and an annular cooling chamber 43 located in the region of the neutrodes 6 to 12 which surrounds all the neutrodes 6 to 12. Cooling water KW is fed via the supply pipes 39 and 41. The cooling water fed by the supply pipe 39 passes a longitudinal channel 44 and is primarily directed to the annular circulation channel 42 surrounding the thermically most loaded anode 3. Therefrom, the cooling water flows through the cooling chamber 43 along the jacket surface of the neutrodes 6 to 12 back and through a longitudinal channel 45 into the annular circulation channel 37. The cooling water fed by the supply pipe 41 enters the annular circulation channel 38 and, therefrom, a cooling chamber 46 associated to each cathode assembly 1; the cooling chamber 46 is subdivided by a cylindrical wall 47. From the cathode assemblies, the cooling water finally flows into the annular circulation channel 37 as well, and the entire cooling water escapes the apparatus via supply pipe 40.

In FIG. 1 of the drawings, also the approximate course of the electric arcs 50 (two of them are shown) are schematically indicated. The foots thereof, close to the anode member, are evenly distributed along the inner circumference of the annular anode member 3. Furthermore, there is shown, in dashed lines, the initial portion of the free plasma torch PS symmetrically escaping from the plasma channel 4.

The supply of the coating material, e.g. metallic powder, into the free plasma torch is accomplished by means of a annular supply assembly 51 made of a heat resistant material and being fixed to the metallic sleeve member 17 located close to the anode member 3. The annular supply assembly 51 is provided with a plurality of channels 52 having the shape of radially extending bores to which the coating material SM is fed by means of a carrier gas via connecting tubes 53. In the present example, two radially extending bores are provided one opposite the other one. However, a design is possible having an annular supply assembly with only one channel 52, or a design incorporating three or more radially extending channels; in the latter case, the channels 52 preferably are evenly distributed along the circumference of the annular supply assembly 51. Furthermore, the possibility exists to incline the channels 52 with reference to a perpendicular axial plane of the annular supply assembly 51; thereby, the channels can be directed either towards the plasma torch PS or away from the plasma torch PS, as appropriate.

Figure 2:
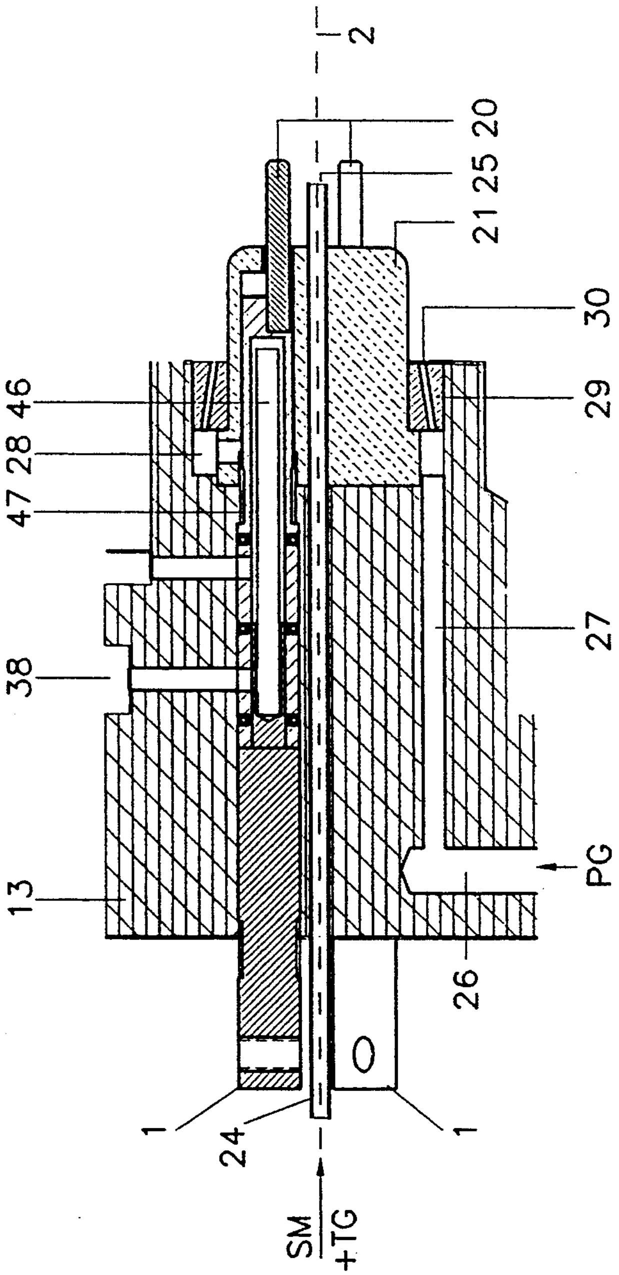
FIG. 2 shows a partial sectional view illustrating the cathode assembly and associated parts of a second embodiment of the plasma spray apparatus.

Under certain circumstances, it can be advantageous, to provide not only a supply of the coating material into the free plasma torch PS in a region close to the anode, but also a supply of coating material PS together with a carrier gas TG at the end of the plasmatron close to the cathode. For this purpose, according to the embodiment partially shown in FIG. 2, a supply tube 24 can be provided which axially penetrates the cathode support member 13 and the insulating member 21. In all other respects, the cathode assembly according to FIG. 2 is equal to the one shown in FIG. 1 and the same parts are designated with the same reference numerals.

As is known in the art, if the coating material is supplied close to the cathode, the entire energy of the electric arc can be utilized for melting the coating material, and not only that portion of the energy which is transmitted from the electric arc to the plasma torch. Having in mind the above mentioned energy situation and the high energy concentration in the cathode chamber, it appears to be advantageous to supply coating material having a high melting temperature through the cathode assembly 13, 20, 21 shown in FIG. 2 and coasting material having a lower melting temperature by means of the afore mentioned annular supply assembly 51 shown in FIG. 1. Under these circumstances, the same plasmatron can be operated, simultaneously or alternately, with cathode-sided coating material supply and anode-sided coating material supply.

What is claimed is:

1. A plasma spray apparatus for spraying powdery material, particularly for the coating of the surface of a work piece, comprising:

- an indirect plasmatron adapted to create an elongated plasma torch, having a central longitudinal axis;
- means for feeding said powdery material into said plasma torch;
- said plasmatron comprising a cathode assembly having at least three cathode members evenly distributed along a circle around said central longitudinal axis of said plasmatron, an annular anode member located distantly from said cathode member and a plasma channel extending from said cathode assembly to said anode member and having a cathode side end as well as an anode side end;
- said plasma channel being delimited by said annular anode member as well as by a plurality of annular neutrode members which are electrically insulated from each other; and
- said means for feeding said powdery material into said plasma torch being located at said anode end of said plasma channel.

2. A plasma spray apparatus according to claim 1 in which said means for feeding said powdery material into said plasma torch comprises an annular feeding assembly fixed to said plasmatron at the anode side end of said plasma channel, said annular feeding assembly comprising at least one powder feeding channel extending from the outside of the annular feeding assembly to the interior thereof, an outer end of said at least one powder feeding channel being connected to a connecting pipe.

3. A plasma spray apparatus according to claim 2 in which said at least one powder feeding channel extends in an essentially radial direction with reference to said central longitudinal axis of said plasmatron.

4. A plasma spray apparatus according to claim 2 in which said at least one powder feeding channel is inclined with reference to a plane running perpendicular to said central longitudinal axis of said plasmatron either towards said plasma torch or away from said plasma torch.

5. A plasma spray apparatus according to claim 2 in which there are provided two powder feeding channels which are located opposite to each other.

6. A plasma spray apparatus according to claim 2 in which there are provided three or more powder feeding channels which are evenly distributed along the circumference of said annular feeding assembly.

7. A plasma spray apparatus according to claim 1 in which said plasma channel comprises a zone with reduced diameter located in the region of said cathode assembly, said plasma channel opening up from said zone with reduced diameter towards said anode member.

8. A plasma spray apparatus for spraying powdery material, particularly for the coating of the surface of a work piece, comprising:

- an indirect plasmatron adapted to create an elongated plasma torch, having a central longitudinal axis;
- first means for radially feeding said powdery material into said plasma torch;
- second means for axially feeding said powdery material into said plasma torch;
- said plasmatron comprising a cathode assembly having at least three cathode members evenly distributed along a circle around said central longitudinal axis of said plasmatron, an annular anode member located distantly from said cathode member and a plasma channel extending from said cathode assembly to said anode member and having a cathode side end as well as an anode side end;
- said plasma channel being delimited by said annular anode member as well as by a plurality of annular neutrode members which are electrically insulated from each other;
- said first means for feeding said powdery material into said plasma torch being located at said anode side end of said plasma channel; and
- said second means for feeding said powdery material into said plasma torch being located at said cathode side end of said plasma channel.

9. A plasma spray apparatus according to claim 8 in which said first means for axially feeding said powdery material into said plasma torch comprises an annular feeding assembly fixed to said plasmatron at the anode side end of said plasma channel, said annular feeding assembly comprising at least one powder feeding channel extending from the outside of the annular feeding assembly to the interior thereof, an outer end of said at least one powder feeding channel being connected to a connecting pipe.

10. A plasma spray apparatus according to claim 9 in which said at least one powder feeding channel extends in an essentially radial direction with reference to said central longitudinal axis of said plasmatron.

11. A plasma spray apparatus according to claim 9 in which said at least one powder feeding channel is inclined with reference to a plane running perpendicular to said central longitudinal axis of said plasmatron either towards said plasma torch or away from said plasma torch.

12. A plasma spray apparatus according to claim 9 in which there are provided two powder feeding channels which are located opposite to each other.

13. A plasma spray apparatus according to claim 9 in which there are provided three or more powder feeding channels which are evenly distributed along the circumference of said annular feeding assembly.

14. A plasma spray apparatus according to claim 8 in which said second means for axially feeding said powdery material into said plasma torch comprise a centrally located feeding tube directed towards said plasma channel and penetrating into the interior of said neutrode which is closest to said cathode assembly.

* * * * *